United States Patent [19]

Smith et al.

[11] 4,177,827
[45] Dec. 11, 1979

[54] PIPE PLUGGING DEVICE

[75] Inventors: Joseph B. Smith, Berea; Edward B. Smith, Cleveland Heights; Gregory D. Schroeder; William B. Smith, both of Berea, all of Ohio

[73] Assignee: The Pipe Line Development Co., Cleveland, Ohio

[21] Appl. No.: 839,608

[22] Filed: Oct. 5, 1977

[51] Int. Cl.² .......................................... F16K 43/00
[52] U.S. Cl. .............................. 137/318; 137/246.22; 137/340; 166/55; 138/94
[58] Field of Search ................. 251/1 A, 187; 166/55, 166/55.1; 137/318, 317, 340, 246.22; 138/94

[56] References Cited

U.S. PATENT DOCUMENTS

| Re. 29,299 | 7/1977 | Estes et al. | 137/246.22 |
|---|---|---|---|
| 1,808,715 | 6/1931 | Reynolds | 137/317 |
| 2,823,696 | 2/1958 | Detlefsen | 137/340 |
| 3,532,113 | 10/1970 | McKean | 137/318 |
| 3,590,920 | 7/1971 | Orund | 166/361 |
| 3,687,166 | 8/1972 | Herrin | 137/318 |
| 3,833,020 | 9/1974 | Smith | 137/318 |
| 3,863,667 | 2/1975 | Ward | 137/318 |
| 3,867,964 | 2/1975 | Gardner | 137/318 |
| 3,958,592 | 5/1976 | Wells et al. | 137/246.22 |

FOREIGN PATENT DOCUMENTS 1288250  9/1972  United Kingdom ..................... 137/340

*Primary Examiner*—Martin P. Schwadron
*Assistant Examiner*—A. Michael Chambers
*Attorney, Agent, or Firm*—Pearne, Gordon & Sessions

[57] ABSTRACT

Apparatus for altering flow in an existing pipeline, including a shear and first actuator means for cutting transversely through the pipe wall and independent second actuator means for moving a surface associated with the shear into engagement with a sealing surface surrounding the pipe. The shear operates through a rotary valve element, mounted directly in a body of a housing surrounding the pipe. Channels encircling the shear sealing surfaces and rotary valve element distribute sealant between the respective mating surfaces to assure a fluidtight assembly. Fluid circulates through a chamber carried on the housing to isolate the first shear actuator means from the pipeline fluid. In a variant of the invention, a flapper plate valve replaces the rotary valve element where the pipe size is relatively large.

18 Claims, 10 Drawing Figures

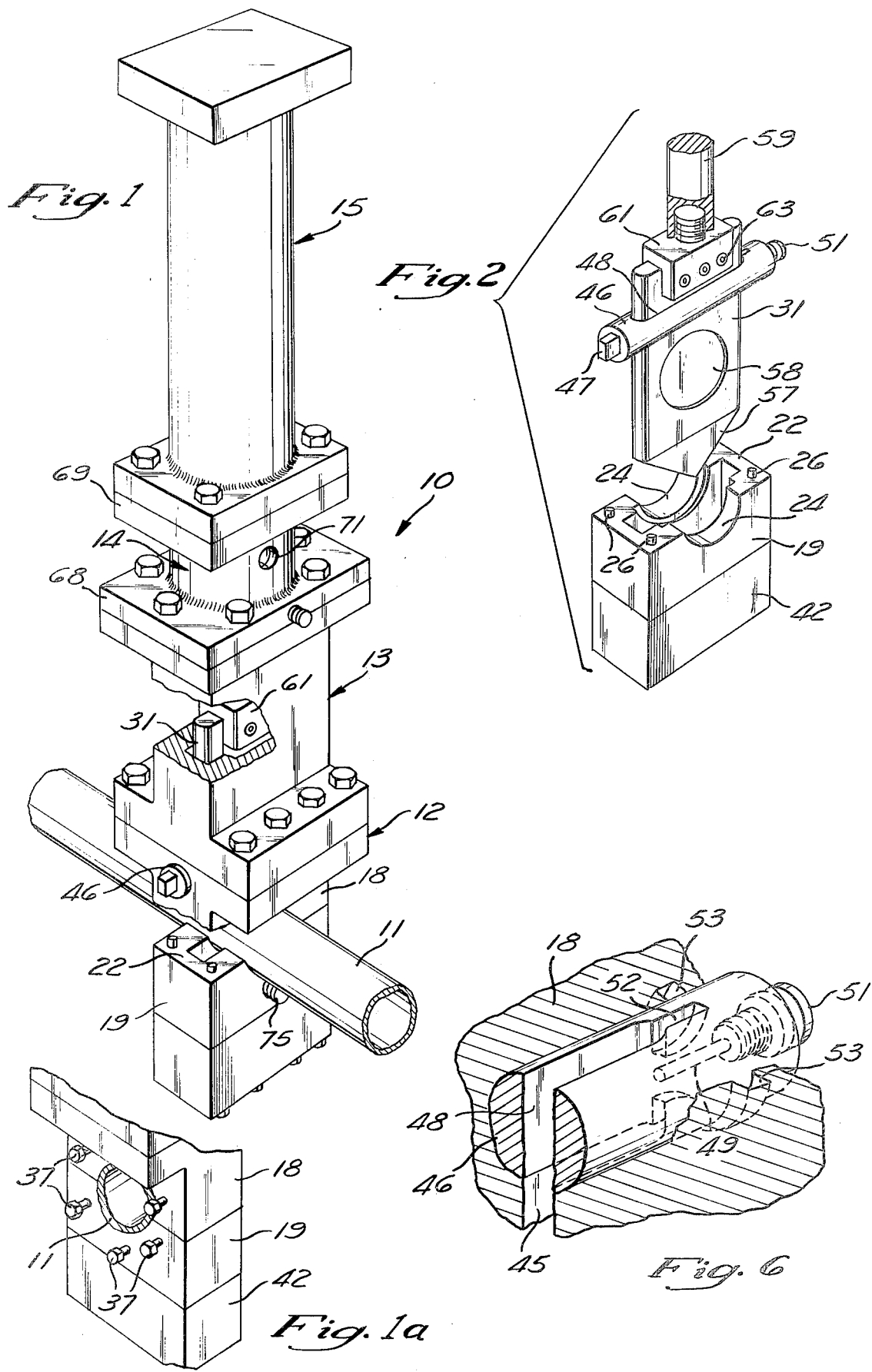

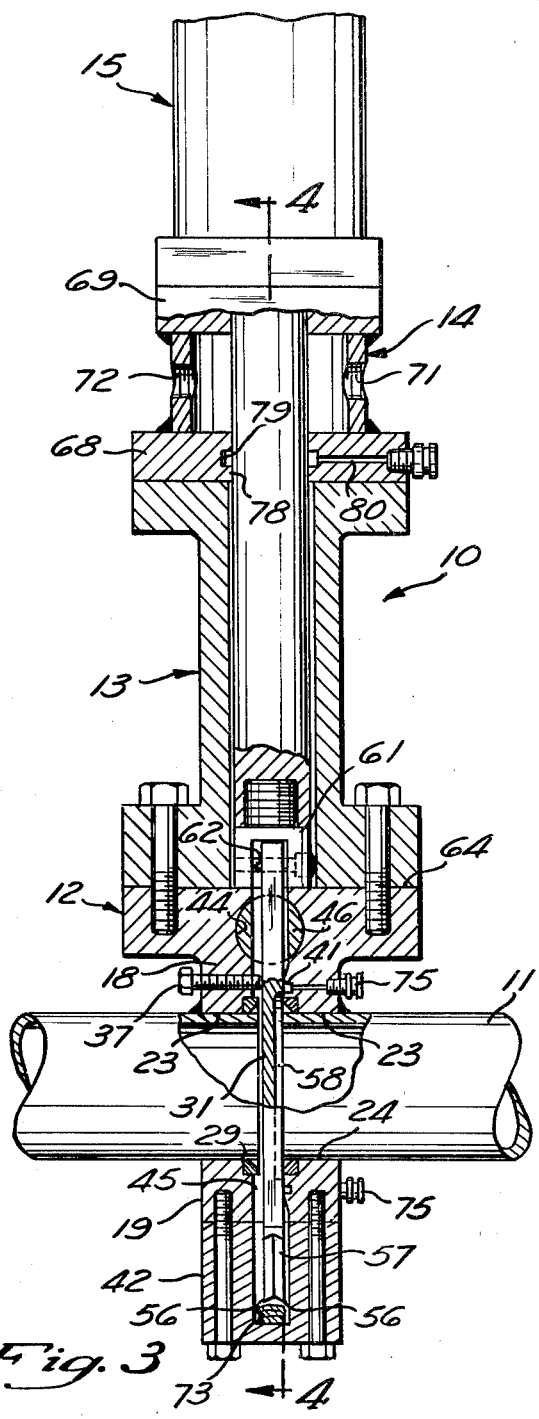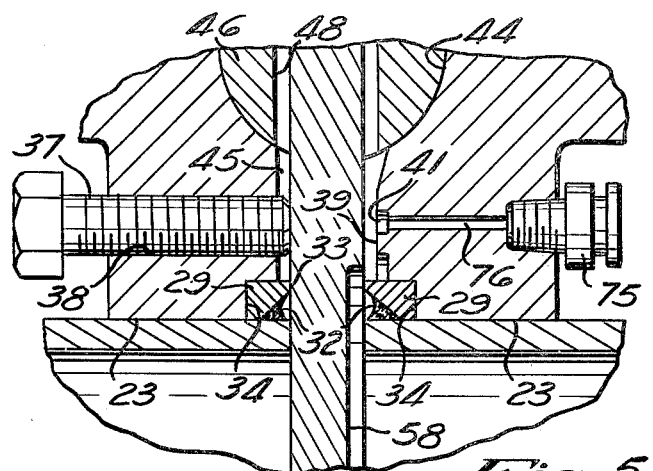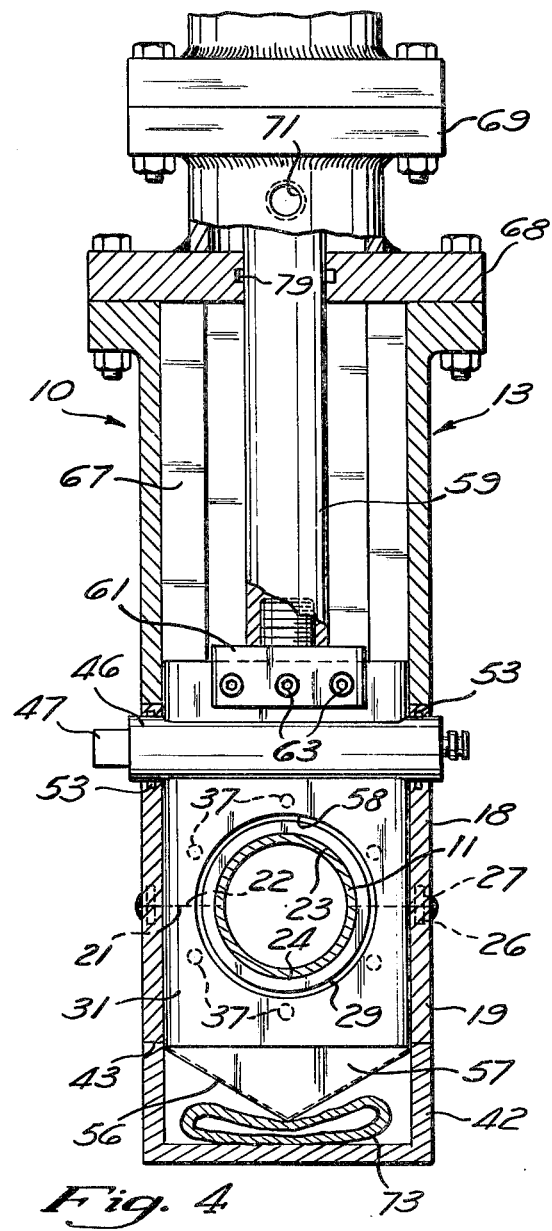

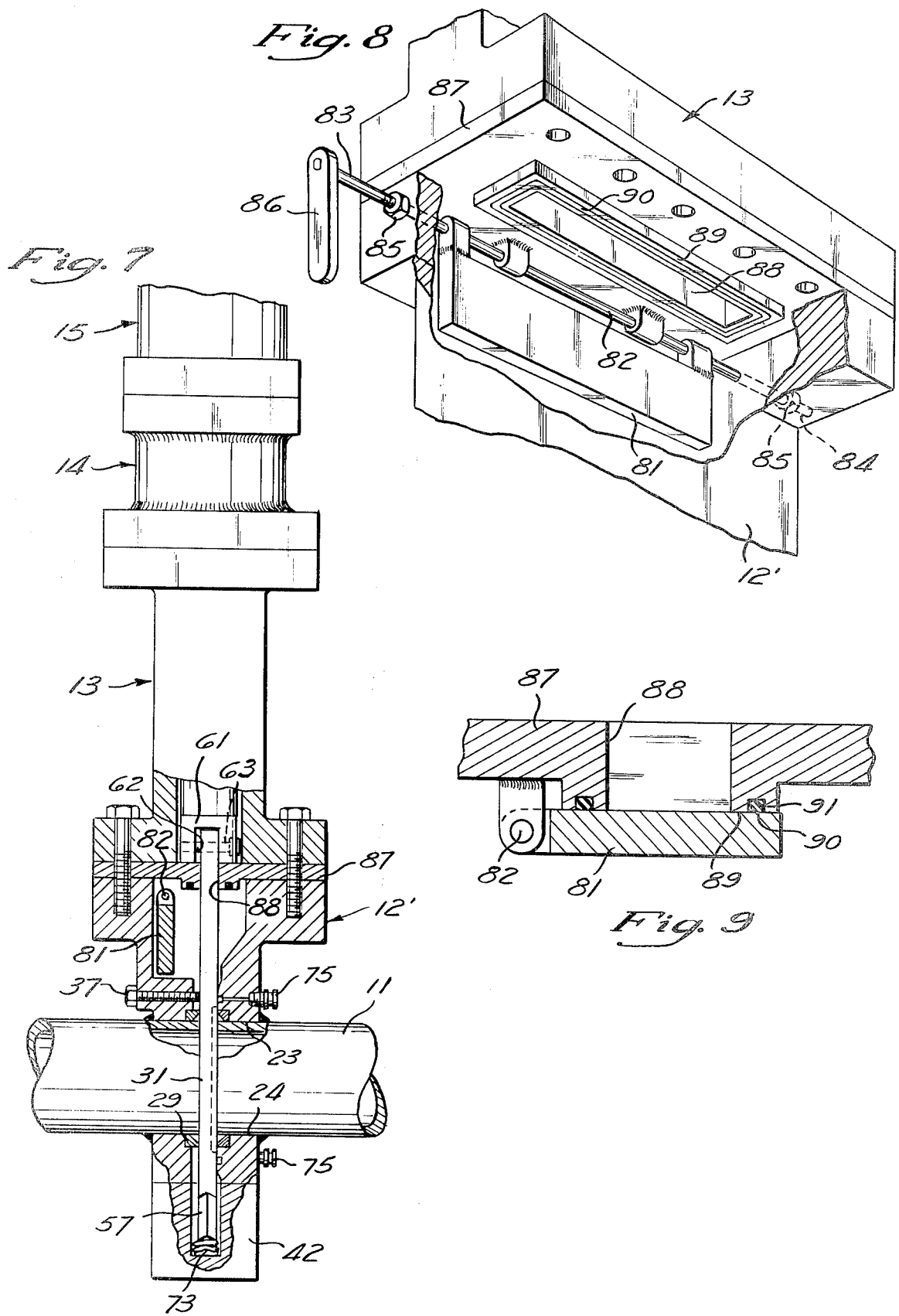

PIPE PLUGGING DEVICE

BACKGROUND OF THE INVENTION

The invention relates to flow control devices for pipelines and the like and, in particular, to control apparatus adapted to be installed on a pipeline while it is in service.

PRIOR ART

U.S. Pat. Nos. 3,590,920 to Orund et al; 3,687,166 to Herrin; 3,833,020 to Smith; 3,863,667 to Ward; and 3,867,964 to Gardner represent the general class of apparatus to which the present invention pertains. These patents disclose apparatus for shearing into the wall of an existing pipeline at a suitable location to stop or divert flow therethrough. Usually, either during movement of the shear or subsequent to its period of motion, the shear or an element mounted thereon is caused to seal the cross section of the pipe. Such devices in the prior art have been relatively large in comparison to the size of the pipe being worked on and, as a consequence, relatively heavy and expensive to manufacture. Minimizing the cost of such apparatus is important because much, if not all, of the hardware is permanently attached to the pipeline and ordinarily cannot be reused.

SUMMARY OF THE INVENTION

The invention provides improvements in flow control apparatus for use in pre-existing pipelines which effect substantial savings in cost while providing the functions necessary to reliably and effectively stop or divert flow in a pipeline. The apparatus includes a fluidtight housing mounted about the periphery of the pipeline and enclosing a zone for operation of a shear. Actuator means carried on the housing walls and symmetrically arranged about the axis of the pipeline is effective to axially force a surface, carried with the shear into the zone of the pipe, against an opposed surface at a plane of shear to close off and seal an associated length of the pipeline. The sealing actuator means is operable independently of movement of the shear for full control, sealing effectiveness, and dependability.

As disclosed, the sealing actuator means comprises a plurality of thrust screws each manipulated through the wall of the housing. In the preferred embodiment, the screws are operable on the shear itself to move it axially into sealing engagement with a surface within the housing. The housing, preferably fabricated as a weldment, includes a machined surface at a plane of shear to provide a suitable seat for cooperation with an opposed face of the shear. Associated with the machined seating surface of the housing are channels and passages for carrying sealant to the areas of contact between the shear and housing wall to ensure complete sealing effectiveness regardless of normally unavoidable factors, such as misalignment and distortion of various elements and the presence of foreign material.

Integrally formed with the housing is a rotary valve through which the shear is adapted to extend and to retract into the cross section of the pipe. The rotary valve or cock has the advantages of requiring limited fabrication expense and low actuating force during service. In accordance with the invention, close machining tolerances in the valve surfaces are avoided by providing channels in the housing surrounding the rotary valve element, which may be filled with sealant. In a variation of the invention, a flapper plate valve is provided within the housing as an alternative to the rotary valve in applications where the size of a pipe being operated upon is relatively large.

These, as well as other features and advantages of the invention, will become apparent from an understanding of one embodiment of the invention disclosed hereinbelow.

BRIEF DESCRIPTION OF THE DRAWINGS

FIG. 1 is a perspective view of a pipe plugging device, constructed in accordance with the invention, installed on a length of pipeline;

FIG. 1a is a fragmentary, perspective view of a portion of the device viewed from a side opposite that of FIG. 1;

FIG. 2 is a perspective, exploded view of a portion of the device illustrating details of its internal parts;

FIG. 3 is a cross sectional view of the device taken through a central plane longitudinal with the pipe;

FIG. 4 is a cross sectional view of the device taken through a plane transverse to the pipe;

FIG. 5 is a fragmentary, cross sectional view on an enlarged scale of portions of a housing and shear of the device;

FIG. 6 is a perspective, fragmentary view of a rotary valve member in its operating bore within the housing of the device;

FIG. 7 is a cross sectional view similar to FIG. 3 of a device embodying a variation of the invention in which is employed a flapper plate valve;

FIG. 8 is a fragmentary, perspective view of a portion of a housing and flapper plate valve elements; and FIG. 9 is an enlarged, fragmentary, sectional view of the flapper plate and seating area of the housing.

DESCRIPTION OF THE PREFERRED EMBODIMENT

Apparatus 10, constructed in accordance with the invention, for stopping or diverting flow in a pre-existing pipeline 11 includes a fluidtight housing 12, a shear receiving compartment 13, a temperature and pressure isolating chamber 14, and a shear actuator 15.

The housing 12 is a hollow, generally rectangular, blocklike structure, preferably fabricated as a steel weldment. The housing comprises mating upper and lower saddle sections 18 and 19 abutting at opposed, planar surfaces 21 and 22. Each section 18 and 19 includes a pair of aligned, semicircular notches 23, 24. A plurality of dowel pins 26 (FIGS. 2 and 4) are press-fitted or otherwise fixed to the lower housing section 19 at its mating face 22 to cooperate with corresponding holes 27 in the opposed face 21 of the upper section 18 to accurately register these sections relative to one another such that the interior surfaces of the housing 12 are in alignment.

Prior to placement of the saddle sections 18 and 19 on the pipeline 11, a pair of reinforcing rings 29 are welded in place around the pipeline in planes perpendicular to the pipe axis. The rings 29 are spaced from each other a predetermined distance to provide passage therebetween of a shear and blocking plate 31. The rings 29, which may be formed in semicircular segments, are beveled at their inner faces to provide clearance for weld beads 32 (FIG. 5), securing them to the exterior of the pipe. As will be understood, inner faces 33 of the rings define planes of shear between which an axial segment of pipe is removed during operation of the apparatus.

With the rings welded at a desired location on the pipe 11, the housing saddle sections 18 and 19 are asembled over the pipe with the rings disposed in annular grooves 34 (FIG. 5) machined in the housing sections. The saddle sections 18 and 19 are subsequently welded to the pipe and to each other, taking care that all welded joints are made fluidtight.

Symmetrically arranged about the center or axis of the pipe on one side of the housing, with respect to the longitudinal direction of the pipe, is a plurality of thrust actuating screws 37 adapted to bear against the shear plate 31. The screws 37 are received in threaded bores 38 in both sections 18 and 19 of the housing 12 and extend in axial alignment with the pipeline 11. Facing the screws 37 on the opposite side of the housing 12 is a machined seat 39 formed by annular surfaces concentric with and transverse to the pipe axis. The surfaces forming the seat 39 are interrupted by a circumferentially continuous, annular channel 41. A hollow, rectangular cap 42, conveniently formed as a steel weldment, is bolted to a bottom face 43 of the lower housing section 19.

A cylindrical cross bore 44 is drilled through the upper saddle housing section 18 completely intercepting and in centered, parallel relationship to a rectangular cavity or interior 45 of the housing. A cylindrical steel pin 46 extends through the cross bore 44 and is axially retained therein by C-washers (not shown) at each end thereof, or other suitable means permitting rotation of the pin within the bore. One end 47 of the pin 46 is machined to provide a square or other acircular cross section for reception of a wrench or tool for manually turning the pin within the bore 44. A slot 48 is milled through the pin 46 and extends substantially across the full width of the rectangular cavity 45. When rotated 90 degrees from the position illustrated in FIG. 3, the pin 46 is adapted to close off communication along the rectangular cavity or passage 45 between the pipeline 11 and the interior of the shear receiving compartment 13. With reference to FIG. 6, an axial passage 49 in the pin 46 affords communication between a conventional buttonhead-type, one-way injection fitting 51 and the slot 48. A set of four notches 52 in the periphery of the pin 46 underlie annular channels 53 formed at each side of the housing bore.

The shear 31 is conveniently fabricated from steel plate and comprises a planar body and a pointed or triangular cutting head 57 bolted or otherwise secured to the body. The lead end of the cutting head 57 is formed with a pair of spaced cutting edges 56. As shown most clearly in FIG. 2, the pin slot 48 is dimensioned to permit the shear 31 to pass therethrough in a plane transverse to the longitudinal axis of the pipe. A circular relief or hollow 58 is machined in a side of the shear body facing the seat 39. As illustrated, the relief 58 is of a diameter somewhat larger than the reinforcing rings 29 and smaller than the diameter of the machined seat 39. The shear 31 is connected to a piston rod 59 of the actuator 15 by a clevis 61. With reference to FIG. 3, a slot 62 of the clevis 61 receiving the upper end of the shear 31 is dimensioned to provide substantial clearance on both sides of the shear in the axial direction of the pipeline. The shear 31 is retained in the clevis slot 62 by a set of bolts 63 which provide a sliding fit for the shear plate 31 in the axial direction of the pipe. The clevis 61 and plate 31 are dimensioned such that when the clevis abuts an upper face 64 of the housing 12, the circular relief 58 is centered with the axis of the pipe 11.

Like the housing 12, the shear receiving compartment 13 is ideally fabricated as a steel weldment and is fluidtight. The compartment 13 is bolted or otherwise removably secured against an upper housing face 64. The interior, designated 67, of the compartment 13, is dimensioned to receive the full extent of the shear 31 and clevis 61.

The illustrated actuator 15 is a conventional, hydraulically actuated, double-acting piston and cylinder unit. Bolted or otherwise fixed between the shear compartment 13 and actuator 15 is the pressure and temperature isolating chamber 14. In the illustrated form, the isolating chamber 14 is a relatively short steel cylinder having rectangular flanges 68 and 69 welded at both of its ends. Each of the flanges is adapted to mate with respective ends of the compartment 13 and actuator 15. Inlet and outlet ports 71 and 72 are provided on opposite sides of the chamber 14.

Operation of the device, once the housing has been welded on the pipe 11, and the compartment 13, chamber 14 and actuator 15 have been assembled thereon, is as follows. Initially, the piston rod 59 is retracted into the cylinder of the actuator 15 so that the shear 31 is disposed completely within the interior of the compartment 13. The rod 59 is extended by operation of the actuator 15 to force the shear 31 through the wall of the pipe 11. The pipe wall is progressively sheared at the planes defined by the inner faces 33 of the reinforcing rings 29, with the result that a short, axial segment or coupon 73 is severed from the pipe 11. As shown in FIG. 4, the coupon 73 is in a flattened condition as it separates from the pipe.

With the relief or recess 58 centered with the axis of the pipe, in accordance with the invention, the plurality of thrust screws 37 disposed on the housing 13 are operated to forcibly drive the shear 31 axially to the right as viewed in FIG. 3 against the seat 39 so that the adjacent surface of the plate 31 sealingly engages the seat, thereby fully interrupting flow of fluid through the pipeline. As indicated in FIG. 4, the thrust screws 37 are disposed in both of the housing sections 18 and 19 in a circumferential pattern generally symmetrical about the axis of the pipe 11. The screws 37 are turned manually or by a power wrench, preferably with a tightening sequence in which screws on opposite sides of the pipe axis are successively turned to avoid undue distortion of the plate 31. The final torque level applied to the individual screws 37 depends on the pressure of the liquid to be contained in the length of pipeline 11 to the right of the housing as viewed in FIG. 3. As previously indicated, the width of the clevis slot 62 is adequate to permit the plate 31 to slide on the bolts 63 a distance sufficient for engagement between the plate 31 and seat 39. To ensure that engagement between the plate and seat surfaces is fluidtight, a commercially available sealant, suitable for the temperature and pressure environment involved, is injected under pressure through conventional one-way injection fittings 75 on the exterior of the housing 12 and associated passages 76 to the circumferential channel 41. The circular relief 58 in the plate 31 avoids interference between any burrs or other irregularities on the sheared surface of the pipe, which might otherwise prevent full sealing contact by the shear.

When repair, alteration, or other work in connection with the pipeline has been completed, the screws 37 are retracted and the shear 31 is withdrawn from the pipe into the compartment 13 by operation of the actuator 15. The pin valve element 46 is rotated 90 degrees, ordinarily by manual effort exerted with a wrench on the square end 47. Potential leakage paths associated with the valve element 46 available to fluid in the pipeline are effectively sealed by sealant, of a suitable commercially available grade, introduced into the end fitting 51. After filling the slot 48, the sealant is driven into any crevice between the valve element 46 and the bore 44 in the area surrounding the slot 48. At the same time, sealant makes it way through the notches 52 into the circumferential grooves or channels 53 of the housing, thereby preventing leakage axially along the pin 46. A positive distribution of sealant over the boundary of the pin 46 is thereby afforded. As a result, the pin 46 and bore 44 may be economically fabricated with inexpensive materials and relatively loose tolerances so that the cost of the housing 12 is not unduly affected by the incorporation of an integral valve. With the valve 46 closed and sufficient sealant injected into the associated fitting 51, the compartment 13 may be removed and replaced by a flat plate or other cap having the same bolt hole pattern as that of the compartment.

The temperature and/or pressure within the pipeline 11 is often too severe for the rod and piston seals (not shown) of the actuator 15. The actuator cylinder and piston are isolated from pipeline fluid entering the housing 12 and compartment 13 by fluid contained in the isolating chamber 14. A suitable fluid coolant, such as water, is circulated through the chamber 14 by causing it to enter the inlet 71 and exit the outlet 72. Flow through the chamber is maintained at a sufficient rate to cool the rod 59 below a temperature which would harm the rod or piston seals. The pressure of fluid within the chamber 14 is readily maintained at a level less than that which would be detrimental to the rod seals. Leakage of pipeline fluid along the rod through an axial bore 78 of the flange 68 is prevented by suitable, commercially available sealant forced into a circumferential groove 79 through a radial passsage 80. If desired, channels may be provided at each mating plane between the housing, compartment 13, isolating chamber 14, and actuator 15 for distribution of a sealant or liquid gasket injected in a manner like that used for the circumferential groove 79 surrounding the piston rod 59.

FIGS. 7 to 9 illustrate a variant of the invention in which the same numerals are used to identify the same parts previously described and in which the rotary valve 46 is replaced by other structure. A flapper plate 81 is hinged and suitably fixed to a rod 82 extending at each end 83 and 84 through a modified housing 12'. Holes in the housing 12' through which the rod ends 83, 84 pass are externally sealed by retaining lock nuts 85. The position of the valve plate 81 is controlled by a handle 86 fixed to the rod 82. A plate 87 interposed between the housing 12' and compartment 13 is provided with a rectangular aperture 88 of sufficient size to permit passage therethrough of the shear 31. The plate 87 includes a rectangular boss surface 89 surrounding the aperture 88 and facing the interior of the housing 12'.

Suitable elastomeric packing 90, disposed in a continuous groove 91 on the boss surface 89, is adapted to ensure a fluidtight seal with the flapper plate 81 when the latter is rotated to the position illustrated in FIG. 9. It should be noted that the sealing force on the sealing plate 81 urging it towards the packing 90 and boss surface 89 is proportional to the pressure of any fluid in the housing 12'.

Once the shear 31 has cut through and sealed the pipe 11, as described above, the plate 87, as well as the flapper valve plate 81, may be removed with the compartment 13. Thereafter, the associated face of the housing, designated 64', may be sealed with a cap (not shown) suitably bolted or welded to the housing. Alternatively, the plate 87 may be made an integral part of the housing 12' by fabrication as a weldment before or after installation on the pipe 11, in which case the aperture 88 is sealed by a cap.

The illustrated flapper valve plate 81 is particularly suited for use where the pipeline 11 is relatively large in diameter, such as in the range of 36 inches. In such situations, where the pipe diameter is relatively large, it may become unnecessarily expensive to machine a suitable bore for the cylindrical rotary valve element 46 described in reference to FIGS. 1–6 above.

Although a preferred embodiment of this invention is illustrated, it is to be understood that various modifications and rearrangements of parts may be resorted to without departing from the scope of the invention claimed herein.

What is claimed is:

1. Apparatus for controlling flow through a pipeline or other conduit carrying fluid, comprising a fluidtight housing adapted to be secured around the exterior of a pipeline in a location intermediate its ends, said housing including walls defining a cavity around said pipeline, a shear adapted to operate in said cavity, a shear driving means supported on said housing and connected to said shear for driving said shear transversely through the pipeline, and shear actuator means for moving a shearing surface associated with said shear formed by a face of said shear transverse to an axis parallel to the pipeline axially into engagement with a sealing surface formed in the interior of the housing opposite said actuator means, said sealing surface encircling the interior of the pipeline concentric with and transverse to the pipeline whereby said shear is effective to terminate flow though the pipeline, said housing walls including a wall generally transverse to said pipeline and opposing said encircling sealing surface, said actuator means being carried on said transverse wall of said housing, said actuator means being operable independently of the operation of said shear driving actuator.

2. Apparatus as set forth in claim 1, wherein said actuator means is disposed on said opposing housing wall in a manner such that the force developed on said associated surface by said actuator is generally symmetrical with respect to the axis of the pipe.

3. Apparatus as set forth in claim 2, wherein said actuator means comprises a plurality of axially oriented screws operable from the exterior of said housing.

4. Apparatus as set forth in claim 1, said actuator means being operative on said shear to force said associated surface, through axial displacement of said shear towards said encircling surface, into sealing engagement with said encircling surface.

5. Apparatus as set forth in claim 4, wherein said actuator means comprises a plurality of axially oriented screws operable from the exterior of said housing.

6. Apparatus as set forth in claim 1, wherein said housing includes a wall spaced from said transverse opposing wall and having an interior surface facing said transverse opposing wall, said interior surface providing said encircling surface.

7. Apparatus as set forth in claim 6, wherein said associated surface is formed by a face of said shear transverse to the pipe axis, said shear face having a circular relief of a diameter at least as large as the outside diameter of the pipeline.

8. Apparatus as set forth in claim 7, including sealant receiving channels associated with one of said sealing surfaces and passage means providing communication with said sealant receiving channels from an exterior of said housing.

9. Apparatus as set forth in claim 8, wherein said sealant receiving channels are provided on the wall of said housing associated with said encircling surface.

10. Apparatus as set forth in claim 6, wherein said housing comprises a pair of saddle sections adapted to be assembled around a pipeline, said saddle sections each having faces adapted to mate with one another, and means on at least one of said sections associated with its respective face to mutually align said sections relative to one another when assembled around said pipeline and said faces are in mating relation.

11. A device for controlling flow through a pipeline or other conduit carrying a fluid, comprising a fluidtight housing adapted to be secured around the exterior of a pipeline at a location intermediate its ends, said housing including walls defining a cavity around said pipeline, a compartment releasably mounted on said housing, said compartment having a fluidtight interior in communication with said housing, a shear operable within said housing and compartment to cut transversely through a section of pipeline enclosed by said housing, said compartment interior being adapted to receive said shear when removed from said housing, a cylindrical bore in said housing adjacent said compartment and extending in the transverse plane of the shear, said bore completely intercepting the adjacent cross section of the housing cavity, a cylindrical valve element rotatably disposed in said bore, said valve element including an elongated longitudinal slot, said slot being dimensioned to permit passage of said shear therethrough when said valve element is in a first angular position in said bore, said valve element being arranged to substantially block fluid communication between said housing cavity and chamber interior through said bore when rotated to a second angular position in said bore, circumferential channels surrounding said cylindrical valve element adjacent each end of said bore, and passage means communicating with said channels from the exterior of said housing for introducing sealant to said channels whereby escape of pipeline fluid axially along said valve element is restricted by sealant in said channels.

12. An apparatus as set forth in claim 1, wherein, said shear driving means including a piston and cylinder supported on said housing and connected to said shear for driving said shear transversely through the pipeline, said shear driving means including a piston rod secured to said shear, a chamber disposed between said housing and actuator, said chamber having an end wall generally perpendicular to the piston rod, an aperture in said end wall through which said piston rod is operatively disposed, said end wall preventing entry of pipeline fluid into said chamber whereby said actuator is protected from exposure to pipeline fluid, an inlet and an outlet port in said chamber for respectively admitting and discharging a fluid through said chamber to contact and thereby exchange heat directly with said piston rod to thereby protect said rod from extreme temperature service.

13. Apparatus as set forth in claim 12, including means associated with said aperture for sealing said rod.

14. Apparatus as set forth in claim 13, wherein said rod sealing means includes a circumferential channel formed on said aperture, and passage means providing communication between said channel and the exterior of said chamber for introduction of sealant to said circumferential channel.

15. Apparatus for controlling flow through a pipeline or other conduit carrying a fluid comprising a fluidtight housing adapted to be assembled and secured around the exterior of the pipeline at a location intermediate its ends, said housing including walls which upon assembly define a fluidtight cavity around said pipeline, a shear adapted to operate in said cavity and shear through the wall of the pipeline to develop an opening therethrough, a shear driving means supported on said housing and connected to said shear for driving said shear in cutting action transversely through the pipeline, mating elements forming a sealing surface formed in the interior of the housing opposite shear actuator means, said mating elements being fixed on said housing walls in the form of circular segments assembled around and cooperating to encircle the exterior of the pipeline, said shear actuator means moving a sealing surface associated with said shear formed by a face of said shear transverse to an axis parallel to the pipeline axially upstream against forces developed by pressure in the pipeline into direct engagement with the sealing surface encircling the exterior of the pipeline whereby said shear is effective to terminate flow through the pipeline, said housing walls including a wall generally transverse to said pipeline and opposing said encircling sealing surface, said actuator means being carried on said transverse wall of said housing, sealant receiving channels formed in one of said sealing surfaces, and passage means providing communication with said sealant receiving channels from the exterior of said housing, the sealing effect of the actuator means in developing direct surface-to-surface engagement between said sealing surfaces against pressure within the pipeline being ensured by the capacity of said channels to conduct a sealant into immediate adjacency to such sealing surfaces to obstruct any zones of imperfect direct engagement between said sealing surfaces.

16. Apparatus as set forth in claim 15, wherein said housing includes a cylindrical bore disposed in the path of the shear between the actuator and a pipe receiving area, a cylindrical valve element disposed in said cylindrical bore, an opening in said valve element adapted to permit passage of the shear therethrough when said valve element is in a first angular position, said valve element being adapted to close off the path of the shear within said cylindrical bore when rotated to a second angular position, sealant channel means associated with said cylindrical valve element and said bore circumferentially surrounding said valve element adjacent the ends of said bore, and passage means for introducing sealant to said circumferential channel means from the exterior of said housing.

17. Apparatus as set forth in claim 16, including passage means for conducting sealant into said valve element opening when said valve element is in said second position.

18. Apparatus as set forth in claim 1, including means defining an aperture for entry of said shear into said housing, a flapper valve rotatably mounted in said housing for selectively opening and sealing said aperture, and means external of said housing for operating said flapper valve plate.

* * * * *